J. L. HAWKINS.
FRUIT PICKER.
APPLICATION FILED AUG. 22, 1914.
1,134,849.
Patented Apr. 6, 1915.
2 SHEETS—SHEET 1.
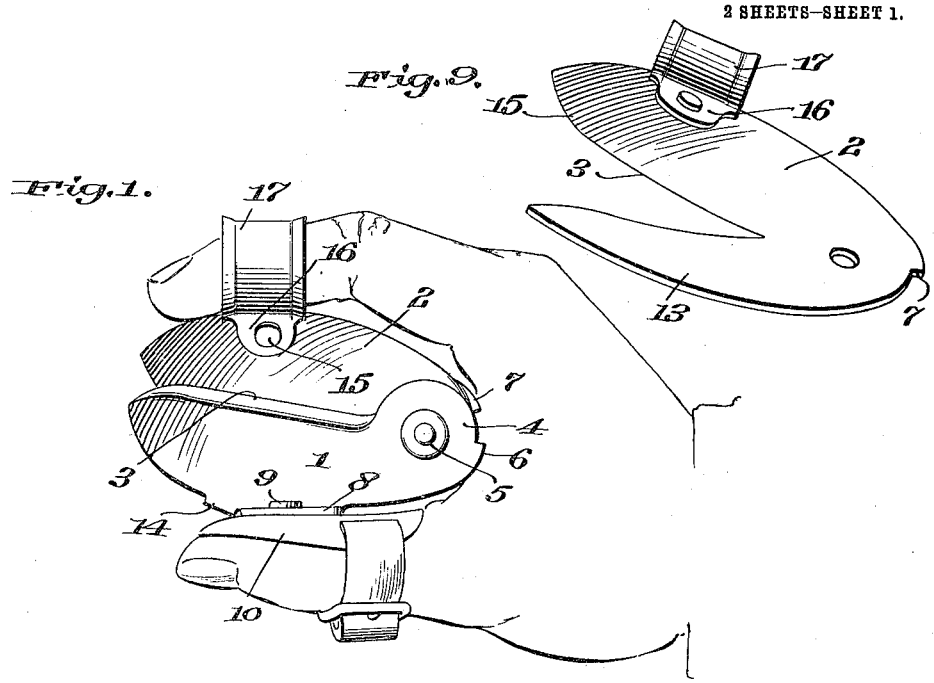
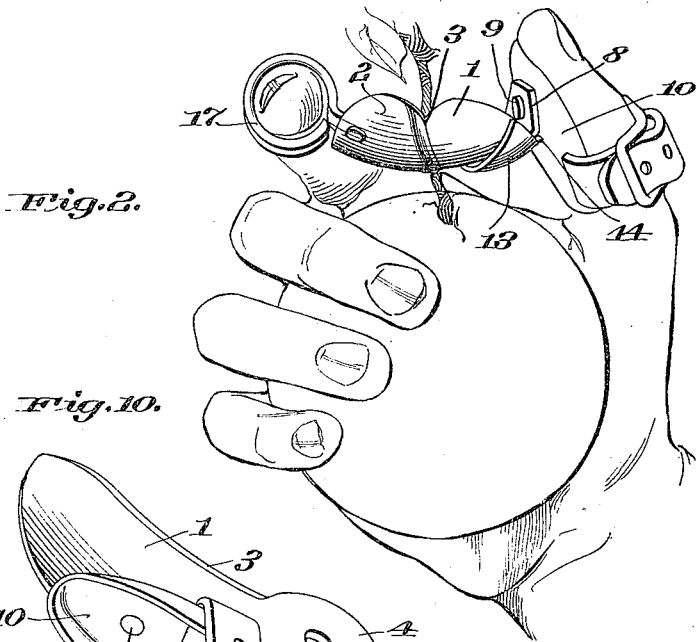
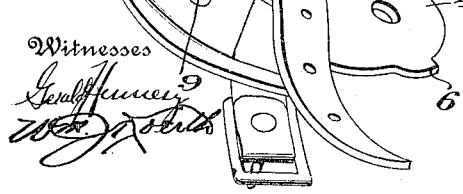
Inventor
J. L. Hawkins,
By Victor J. Evans
Attorney
Witnesses

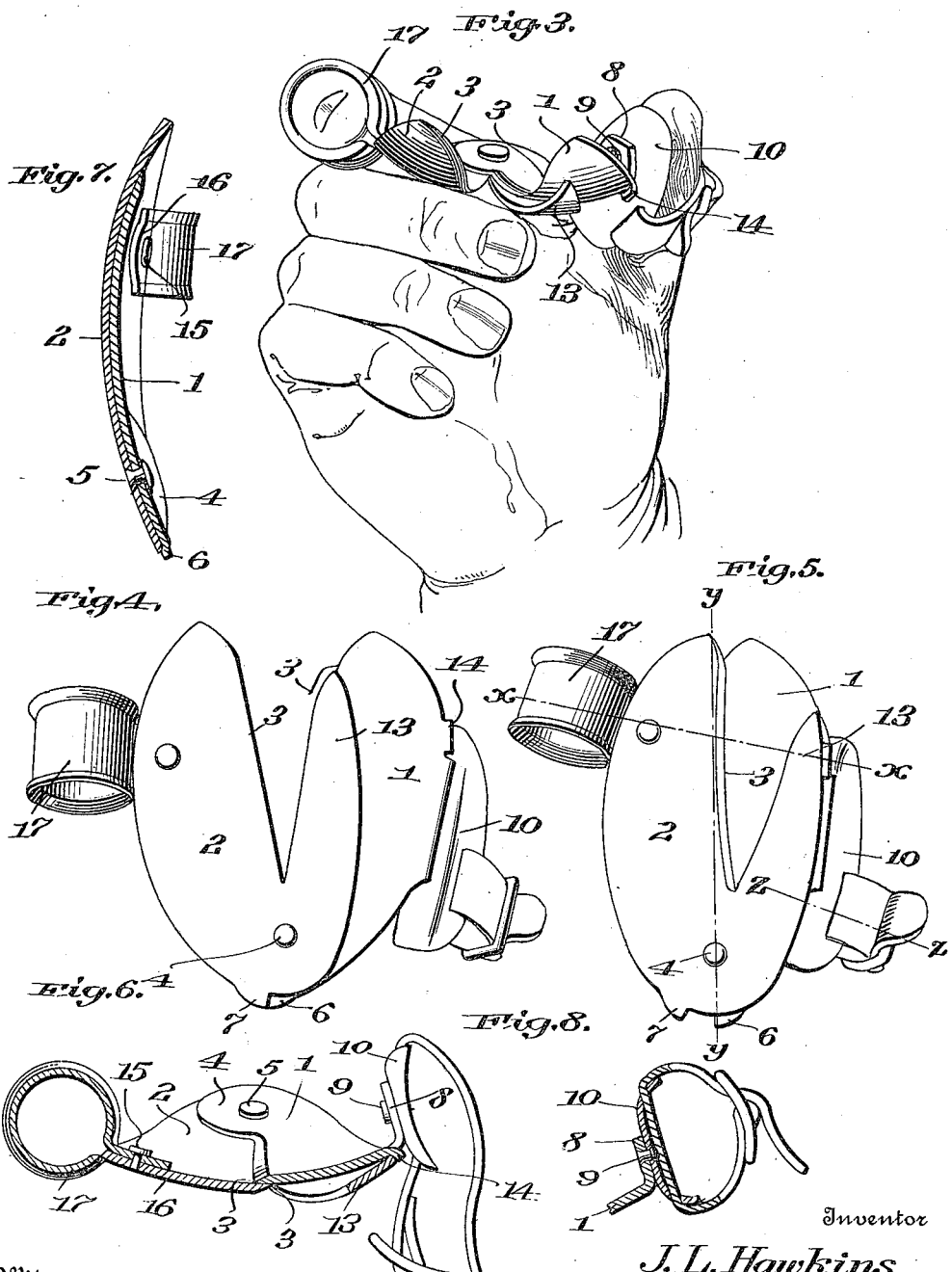

UNITED STATES PATENT OFFICE.

JAMES L. HAWKINS, OF SANTA BARBARA, CALIFORNIA, ASSIGNOR TO HOMER L. HAWKINS, OF SANTA BARBARA, CALIFORNIA.

FRUIT-PICKER.

1,134,849.  Specification of Letters Patent.  Patented Apr. 6, 1915.

Application filed August 22, 1914. Serial No. 858,120.

*To all whom it may concern:*

Be it known that I, JAMES L. HAWKINS, a citizen of the United States, residing at Santa Barbara, in the county of Santa Barbara and State of California, have invented new and useful Improvements in Fruit-Pickers, of which the following is a specification.

The present invention relates to improvements in fruit pickers adapted primarily for severing the stems of fruit, such as oranges, lemons, etc., which if permitted to drop to the ground by shaking the tree or by other methods would become mutilated or otherwise injured so as to affect the sale of the same.

In carrying out my invention I propose to construct a simple, cheap and thoroughly effective device of this character which may be sustained between the fore-finger and thumb of the user so that the same may be arranged upon the stem between the fruit to be picked and the limb of the tree to which the stem is attached, and in which the operator may use his remaining finger to gently press the fruit against his palm and so retain the severed fruit and deposit the same within a suitable receptacle such as a basket which may be carried by the second hand of the operator or upon the arm of the operator.

A further object of the invention is to construct a device of this character which may be readily adjusted to fit different sizes of fore-fingers and thumbs, the same having a pivoted ring member through which passes the forefinger of the operator, while the thumb rests upon a pivoted plate shaped to conform with the shape of the thumb, the said plate being provided with a strap or band whereby the thumb may be effectively secured to the plate, the device comprising a pair of jaws which may be moved toward or away from each other by the spreading of the fore-finger and thumb or moved toward each other compressing the finger and thumb toward each other.

A still further object of the invention is to provide a fruit picker including a pair of jaws which are hingedly connected together, and which are bowl-shaped or of a concavo-convex formation in cross section whereby the same may be readily arranged between the fore-finger and thumb of an operator and also whereby the device will adapt itself to the shape of the bough or limb of a tree from which the fruit is suspended so that the cutting members of the device will not cut below the stem of the fruit and at the same time whereby the device cannot injure the bough or limb of the tree.

A still further object of the invention is to construct a fruit picker comprising a pair of pivoted jaws which work scissor fashion, and to provide the same with suitable stops for regulating both the inward and outward swinging of the jaws, means being provided upon the plates of the device whereby the thumb and fore-finger of an operator may be securely sustained thereon, while a guard is arranged upon the bottom face of the device to prevent the remaining fingers of the operator which are adapted to grasp the fruit from being contacted by the cutting edge of either of the plates.

With the above and other objects in view, the improvement resides in the construction, combination and arrangement of parts set forth in the following specification and falling within the scope of the appended claims.

In the drawings: Figure 1 is a perspective view illustrating the device in applied position, and looking toward the top thereof, Fig. 2 is a similar view looking toward the bottom thereof showing the manner in which the fingers not engaged for operating the gatherer are employed for grasping the fruit when the stem of the same has been severed by the device, Fig. 3 is a front elevation of the device as illustrated in Fig. 2, illustrating the manner in which the fingers are protected from contact with the sharpened edges of the jaws, Fig. 4 is a bottom plan view of the jaws in their open position, Fig. 5 is a similar view with the jaws in their closed position, Fig. 6 is a transverse sectional view on the line $x$—$x$ of Fig. 5, Fig. 7 is a similar sectional view on the line $y$—$y$ of Fig. 5, Fig. 8 is a longitudinal sectional view on the line $z$—$z$ of Fig. 5, Fig. 9 is a perspective view of one of the jaws, and Fig. 10 is a similar view of the second jaw.

My improved picker embodies a pair of substantially similar jaws, which are indicated by the numerals 1 and 2 respectively, and for convenience and in view of the fact that the jaw 1 has its cutting edge overlying the cutting edge of the jaw 2, when the said jaws are swung together, the said jaw 1 will be termed the upper jaw and the jaw 2 will be hereinafter referred to as the lower jaw. Both of the jaws are rounded longitudinally from their outer edges to their inner straight cutting edges 3, and both of said jaws are curved in cross section from their outer longitudinal edges to the said inner or cutting edges thereof. The upper jaw has, what may be termed, its inner end formed with an inwardly extending rounded portion 4 which is provided with an opening for the reception of a pivot 5 whereby the two jaws are connected. The inner edge at the rounded portion of the jaw 1 is provided with an offset 6 forming a contact member which is adapted to engage with a similar offset 7 upon the lower jaw to limit the outward swinging of the pivoted jaws. The upper jaw 1 at its outer longitudinal edge and approximately central thereof is formed with an upturned flange 8, the same being provided with a central opening through which passes a pivot 9, whereby a longitudinally arranged elongated thumb rest 16 is pivotally secured to the said jaw 1. The rest 10 has its longitudinal and outer transverse edge rounded outwardly, its rear edge being straight as is the body of the said rest, and the outwardly turned portions or flanges adjacent the said rear end are formed each with an elongated jaw which has its inner end rounded, corresponding with the rounded inner end of the jaw 1, and the said lower jaw at a suitable distance from its inner or cutting edge 3 is formed with a longitudinally extending integrally formed guard plate 13 which is arranged below the undercurved face of the upper jaw 1, and against which the finger next to the fore-finger of the operator is adapted to rest and be sustained away from the cutting edges of the jaws. The guard plate 13 preferably has its edges rounded and conforms to the shape of the plate which it underlies, and such arrangement permits of the finger of the operator which engages with the said plate being drawn toward or away from the palm of the hand so that fruit of varying sizes may be readily grasped and held after the stems of the same have been severed. The outer longitudinal edge of the guard is adapted to engage with a downturned portion or flange 14 provided upon the outer edge of the upper plate 1, to limit the swinging movement of the jaws in a closing position.

Pivotally secured, as at 15, to the lower jaw 2, and adjacent the outer end thereof, is the offset portion or flange 16 of a ring 17. This ring comprises a split member one of the ends of which being formed with the flange 16 and as the same is constructed of resilient material it will yield to receive the varying sizes of fingers of operators, and by reference to Fig. 1 of the drawings, it will be noted that when the device is in position, the ends of the jaws provided with the rounded edges, which I have termed the inner pivoted portions of the jaws will overlie and rest upon the fleshy portion of the hand between the fore-finger and thumb, the said portion of the hand resting upon the lower jaw will be disposed out of the path of movement of the upper jaw and the stops of both of the jaws, so that injury to this portion of the hand cannot be inflicted by the operation of the device.

From the above description, taken in connection with the accompanying drawings, the simplicity of the device, as well as the advantages thereof will, it is thought, be perfectly apparent to those skilled in the art without further description.

Having thus described the invention, what I claim is:

1. A fruit picker of the class described comprising an upper cutting member and a lower connecting member pivotally connected therewith, stops upon the said members for limiting the outward movement thereof, means whereby the fingers of an operator may be adjustably secured one to each of the members, a guard plate upon the lower member, the stop upon the upper member adapted to contact with the guard plate to limit the swinging of the said members to an open position.

2. In a fruit picker of the class described, two cutting jaws pivotally secured, means upon the jaws for limiting the opening thereof, means for limiting the closing of the jaws, a resilient ring pivotally secured to one of the jaws, a thumb plate arranged at an angle and pivotally secured to the second jaw, and an adjusting member upon the thumb plate.

3. In a fruit picker of the class described, an upper jaw having an inner cutting edge, its outer edge being provided with an angular flange, a thumb plate pivotally secured to the flange, said thumb plate having its longitudinal edges rounded outwardly, an adjustable element upon the thumb plate, a split resilient ring having an offset end pivotally secured to the second jaw, means arranged between both of the jaws for limiting the open swinging movement thereof, a guard plate arranged upon the second jaw and disposed below but in a plane with the first mentioned jaw, a stop upon the first mentioned jaw arranged to contact with the guard when the jaws are closed.

In testimony whereof I affix my signature in presence of two witnesses.

JAMES L. HAWKINS.

Witnesses:
W. C. GAMMILL,
T. M. HAWKINS.